US011677327B2

(12) United States Patent
Huang

(10) Patent No.: US 11,677,327 B2
(45) Date of Patent: Jun. 13, 2023

(54) TRANSFORMER CONVERTER WITH CENTER TAP INDUCTANCE

(71) Applicant: The University of Texas at Austin, Austin, TX (US)

(72) Inventor: Qin Huang, Austin, TX (US)

(73) Assignee: BOARD OF REGENTS, THE UNIVERSITY OF TEXAS SYSTEM, Austin, TX (US)

(*) Notice: Subject to any disclaimer, the term of this patent is extended or adjusted under 35 U.S.C. 154(b) by 84 days.

(21) Appl. No.: 17/273,655

(22) PCT Filed: Sep. 5, 2019

(86) PCT No.: PCT/US2019/049679
§ 371 (c)(1),
(2) Date: Mar. 4, 2021

(87) PCT Pub. No.: WO2020/051288
PCT Pub. Date: Mar. 12, 2020

(65) Prior Publication Data

US 2021/0344275 A1 Nov. 4, 2021

Related U.S. Application Data

(60) Provisional application No. 62/728,468, filed on Sep. 7, 2018.

(51) Int. Cl.
*H02M 5/293* (2006.01)
*H02M 5/14* (2006.01)
(Continued)

(52) U.S. Cl.
CPC ............ *H02M 5/293* (2013.01); *H02M 5/14* (2013.01); *H02M 5/225* (2013.01);
(Continued)

(58) Field of Classification Search
CPC .... H02M 1/009; H02M 3/33561; H02M 5/14; H02M 5/225; H02M 5/293; H02M 7/4807; H02J 3/1842
See application file for complete search history.

(56) References Cited

U.S. PATENT DOCUMENTS 3,970,916 A * 7/1976 Kienscherf ......... H02M 7/4807 363/71
5,038,264 A * 8/1991 Steigerwald ...... H02M 3/33561 363/21.02
(Continued)

FOREIGN PATENT DOCUMENTS

JP S6173564 A 4/1986

OTHER PUBLICATIONS

PCT International Search Report and Written Opinion for PCT/US2019/049679, dated Nov. 14, 2019.

*Primary Examiner* — Fred E Finch, III
(74) *Attorney, Agent, or Firm* — Patterson + Sheridan, LLP

(57) ABSTRACT

A method and apparatus include a primary transformer coil, a secondary transformer coil, and a center tapped inductor coupled to the secondary transformer coil. A first switch may be in electrical communication with the center tapped inductor and may be configured to affect the first output voltage. A second switch may be in electrical communication with the center tapped inductor and may be configured to affect the second output voltage. In a particular example with an analog current (AC) output voltage, the two output voltages are out of phase to each other. In a direct current (DC) implementation, the transformer may be operated to output a positive and a negative output voltage. The apparatus may function as a resonant converter, or may operate in non-resonant mode. In one implementation, an H bridge may provide reactive power support. An inductor filter may be in
(Continued)

electrical communication with the secondary transformer coil. Where desired, a diode bridge may be in electrical communication with the primary transformer coil.

20 Claims, 12 Drawing Sheets

(51) Int. Cl.

| | |
|---|---|
| ***H02M 7/48*** | (2007.01) |
| ***H02M 5/22*** | (2006.01) |
| *H02M 1/00* | (2006.01) |
| *H02J 3/18* | (2006.01) |
| *H02M 3/335* | (2006.01) |

(52) U.S. Cl.

CPC ......... *H02M 7/4807* (2013.01); *H02J 3/1842* (2013.01); *H02M 1/009* (2021.05); *H02M 3/33561* (2013.01)

(56) References Cited

U.S. PATENT DOCUMENTS

| | | | | |
|---|---|---|---|---|
| 10,199,957 | B1 * | 2/2019 | Prakash | H02M 1/44 |
| 2001/0002171 | A1 | 5/2001 | Abdoulin et al. | |
| 2005/0212494 | A1 | 9/2005 | Wu et al. | |
| 2006/0062034 | A1 * | 3/2006 | Mazumder | H02M 7/4837 363/131 |
| 2006/0279966 | A1 | 12/2006 | Fan et al. | |
| 2009/0290384 | A1 * | 11/2009 | Jungreis | H02M 1/4241 363/17 |
| 2010/0177536 | A1 * | 7/2010 | Liu | H02M 3/33592 363/127 |
| 2012/0250369 | A1 * | 10/2012 | Furukawa | H02M 3/337 363/25 |
| 2020/0067424 | A1 * | 2/2020 | Yu | H02M 1/088 |

* cited by examiner

TRANSFORMER CONVERTER WITH CENTER TAP INDUCTANCE

CROSS-REFERENCE TO RELATED APPLICATIONS

This application for Patent is a national stage application under 35 U.S.C. 371 of PCT/US2019/049679, filed Sep. 5, 2019, which claims priority to U.S. Provisional Application No. 62/728,468, filed Sep. 7, 2018, which are both herein incorporated by reference in their entireties.

BACKGROUND

The present invention relates generally to electrical hardware, and more particularly, to power conversion circuitry.

An AC to AC converter is an electronic circuit or electromechanical power converter that can convert an alternating current (AC) waveform to another AC waveform. The output voltage and frequency can be managed according to requirements and usage.

Power levels range from very low (an electric shaver) to very high (high-voltage power transmission). For example, datacenters, servers, and telecommunications systems require high stepdown, AC to AC conversions. In one particular example, line frequency transformers (LFTs) are used to step down voltage in power lines. Conventional LFTs suffer from being heavy, large, and inflexible changes to voltage or frequency.

SUMMARY

According to a particular embodiment, an apparatus includes a primary transformer coil, a secondary transformer coil, and a center tap inductor coupled to the center tapped, secondary transformer coil. A first switch is connected with the inductor and the secondary winding, and may be configured to affect a positive output voltage.

According to a specific implementation, the apparatus may function as a resonant converter. In another embodiment, the apparatus may include a non-resonant converter. An embodiment of the apparatus may include a magnetizing inductance in electrical communication with the primary transformer coil.

The first switch may include a bidirectional switch. For example, the first switch may include a pair of metal-oxide-semiconductor field-effect transistor (MOSFET). Alternatively, the first switch may include a pair of insulated-gate bipolar transistors (IGBT).

In a specific implementation, an H-bridge converter may provide reactive power support. An inductor filter may be in electrical communication with the secondary transformer coil. A diode bridge may be in electrical communication with the primary transformer coil.

In a particular example, the second switch is operated to control a negative half cycle of the output voltage. The second switch may alternatively be operated to control a positive half cycle of the output voltage. The first switch may be operated to control a direct current output.

In another particular embodiment, a method of manufacturing a circuit includes providing a primary transformer coil, providing a secondary transformer coil, and coupling a center tapped inductor to the secondary transformer coil. The method further includes providing a first switch in electrical communication with the center tapped inductor, wherein the first switch is configured to affect an output voltage and providing a second switch in electrical communication with the center tapped inductor.

In one implementation, the method includes providing a diode bridge in electrical communication with the primary transformer, or providing an H bridge to provide reactive power support. An inductor filter in electrical communication with the secondary transformer coil may be provided.

In an example, the method includes wiring the second switch to control a positive half cycle of the output voltage. The second switch may be wired to control a negative half cycle of the output voltage. In another implementation, the first switch may be wired to control a direct current output.

DETAILED DESCRIPTION

An embodiment of a system may include a primary transformer coil, a center tapped secondary transformer coil, and an inductor connected to the center tap. A first switch may be in electrical communication with the center tapped secondary coil and the inductor, and may be configured to affect the first output voltage. A second switch may be in electrical communication with the center tapped secondary coil and the inductor and may be configured to affect to affect the second output voltage. In one respect, these electronic components replace bulky, costly hardware that has been used for a century in conventional line frequency transformers (LFTs).

In a particular example, the second switch is operated to control a negative half cycle of the output voltage. The second switch may alternatively be operated to control a positive half cycle of the output voltage. The transformer system may thus output two out of phase AC voltages, similar to a center tapped LFT. In a direct current (DC) implementation, the first and second switches may be operated to control two DC output voltages with opposite polarity. The apparatus may function as a resonant converter, or may operate in non-resonant mode. In one implementation, an H bridge may provide reactive power support. Inductor filters may be introduced on the primary and secondary sides. Where desired, a diode bridge may be in electrical communication with the primary transformer coil.

Embodiments of the disclosed system may convert a first AC voltage to a second AC voltage with an efficiency of over 98%. This efficiency may be attributable to the soft switching that achieves low losses. Moreover, embodiments of the system may use a smaller number of semiconductor switches than other implementations. Fewer semiconductors may translate into lower costs and higher reliability. The system may be relatively robust, lighter, and more compact than traditional transformers.

In addition to AC to AC conversion, the control functions of different embodiments may be implemented to realize voltage regulation and reactive power support. Implementations may provide short circuit protection and DC output capability. Configurations may support high voltage AC to AC conversions (e.g., the primary side voltage may be around 4,160 volts to around 13.8 kilovolts).

Figure 1:
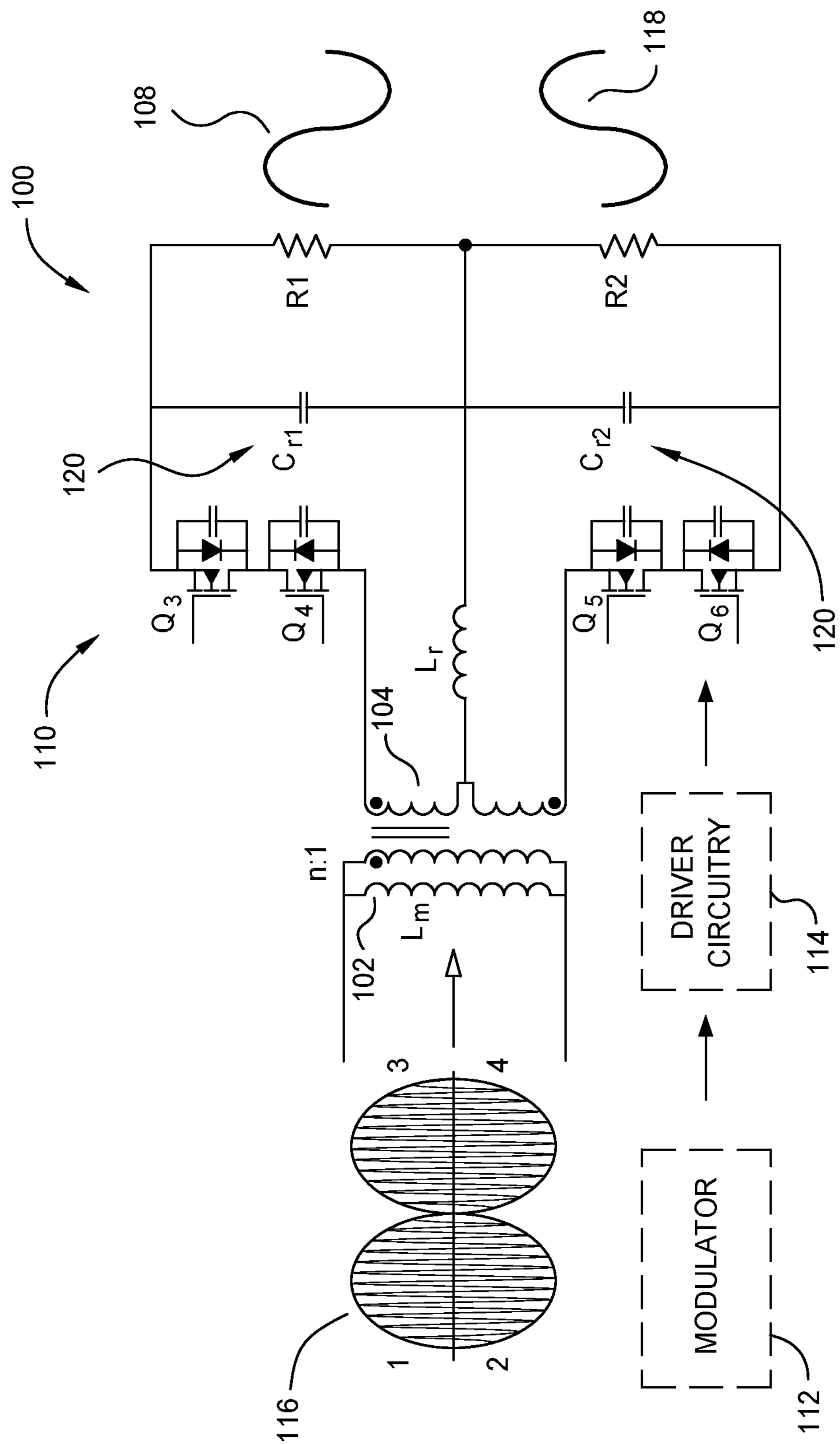
FIG. 1 shows a circuit diagram of an embodiment of a transformer system that includes a resonant converter that performs AC to AC conversion. The converter is fed by a high frequency AC waveform that has two positive cycles and two negative cycles. The converter has two output voltages that are one hundred eighty degrees out of phase with each other.

Turning more particularly to the Drawings, FIG. 1 shows a circuit diagram of an embodiment of a transformer system 100 that comprises a resonant converter that performs AC to AC conversion. The converter includes a center tap transformer and an inductor Lr and switching circuitry to efficiently perform the AC to AC conversion. The transformer system of FIG. 1 is a high frequency transformer, instead of a line frequency transformer (LFT), and may include several sets of current carrying coils (e.g., primary coils 102 and secondary coils 104) wound around a core 106 to step up or down the high frequency AC voltages 116. A magnetization flux is created via a magnetizing inductor, Lm, which is part of the primary coils 102 of the transformer. The auxiliary, or secondary, transformer coils 104 may be positioned on the same core 106. The secondary transformer coils 104 may subsequently be subjected to at least a portion of the same flux from the primary transformer coils 102 to generate induced voltages in the secondary transformer coils 104.

As described herein, the resonant converter of the embodiment of FIG. 1 includes the inductor Lr that is coupled to or otherwise in electrical communication with the secondary transformer coil 102 and a resonant capacitor 120. The inductor Lr of FIG. 1 may function as a resonant inductor. However, other embodiments of converters contemplated within the scope of this disclosure may be non-resonant, such as using phase shift controlled dual active bridge (DAB) or dual half active bridge (DHAB) converters.

Switches Q3, Q4, Q5, and Q6 may be controlled to provide the two sine output waveforms 108, 110 that have opposite phases. For instance, a modulator circuit 112 may generate driver signals that may include a 50% duty cycle at the resonant frequency. The modulator circuit 112 may send signals to the switches Q3, Q4, Q5, and Q6 via driver circuitry 114. The switches Q3, Q4, Q5, and Q6 may be any unidirectional switch, such as a metal-oxide semiconductor field effect transistor (MOSFET). As shown in FIG. 1, a first pair of MOSFET switches Q3, Q4 is used to create an AC switch. The AC switch may be used to process the high frequency pulses 1, 4 of an AC waveform 116. A second pair of switches Q5, Q6 of the converter 100 form a second AC switch for the high frequency pulses 2, 3 of the waveform 116.

The converter may include a secondary tap configuration. More particularly, Lr is a center tap inductor and functions as a resonant inductor. Center tap inductor Lr and a capacitance Cr1 form one resonant loop, and center tap inductor Lr and a capacitance Cr2 form another resonant loop. In the circuit diagram, capacitances Cr1 and Cr2 comprise two split phase outputs 120 that power two resistive loads R1, R2.

Figure 2:
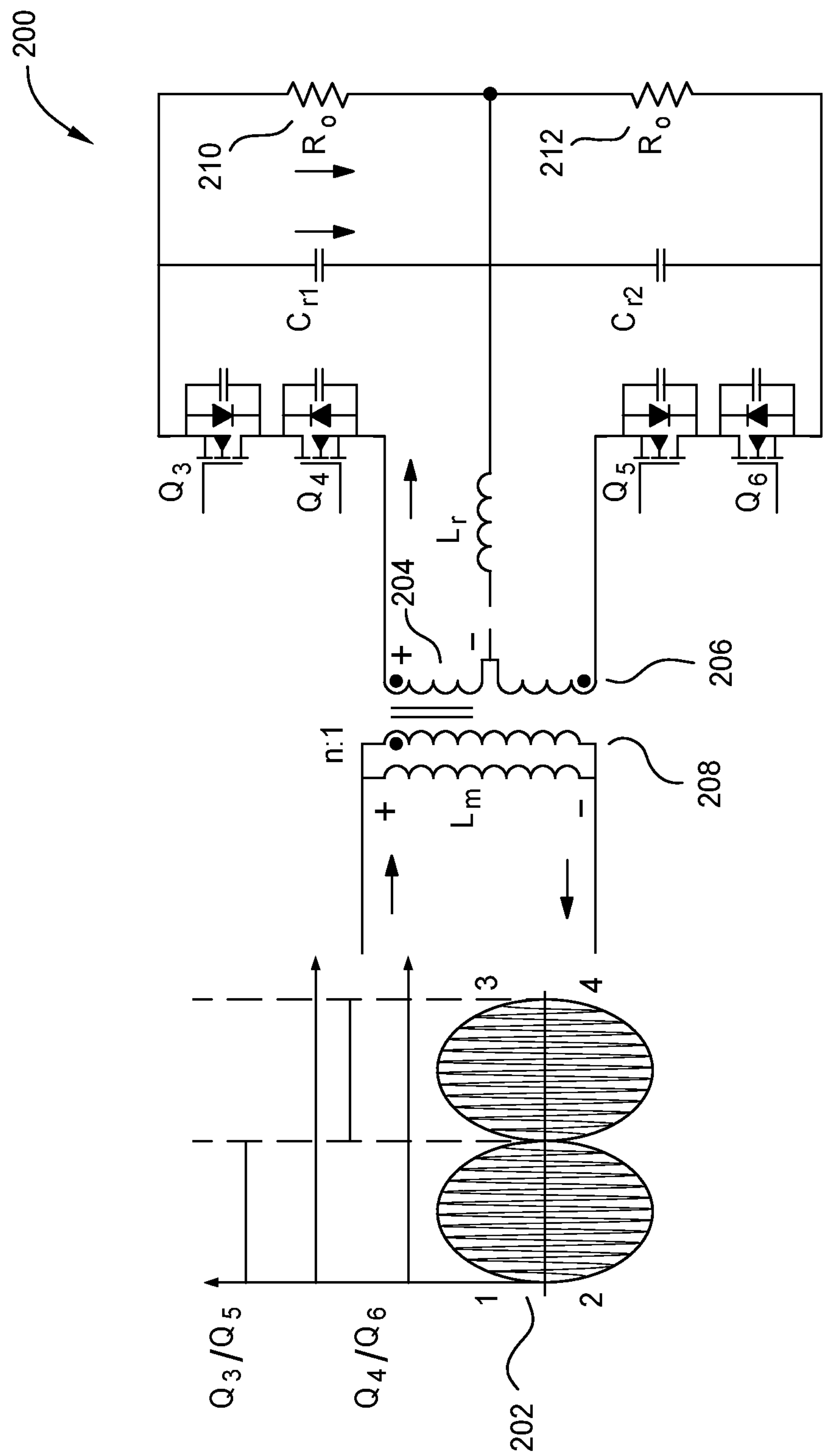
FIG. 2 is a circuit diagram of a transformer system that includes a resonant converter, such as the resonant converter of FIG. 1, with components selected that are responsible for converting a first positive half cycle of an AC waveform to the first output.

FIG. 2 is a circuit diagram of a transformer system 200 that includes a resonant converter, such as the resonant converter of FIG. 1, with components selected 222 that are responsible for converting a first positive half cycle 1 of an AC waveform 202 to the output. Conversion of the first positive half cycle 1 of the AC waveform 202 may be generated in terms of the circuit diagram of FIG. 2 using the center tap inductor Lr, a first portion 204 of a secondary coil 206, a primary coil 208, a resistive output load 210, capacitance Cr1, and switches Q3 and Q4. Arrows show the flow of current through the circuit diagram of the transformer system. As with the resonant converter shown in FIG. 1, the embodiment of the converter in FIG. 2 may also include a magnetizing inductance Lm, a resistive output load 212, a capacitance Cr2, and switches Q5 and Q6.

Figure 3:
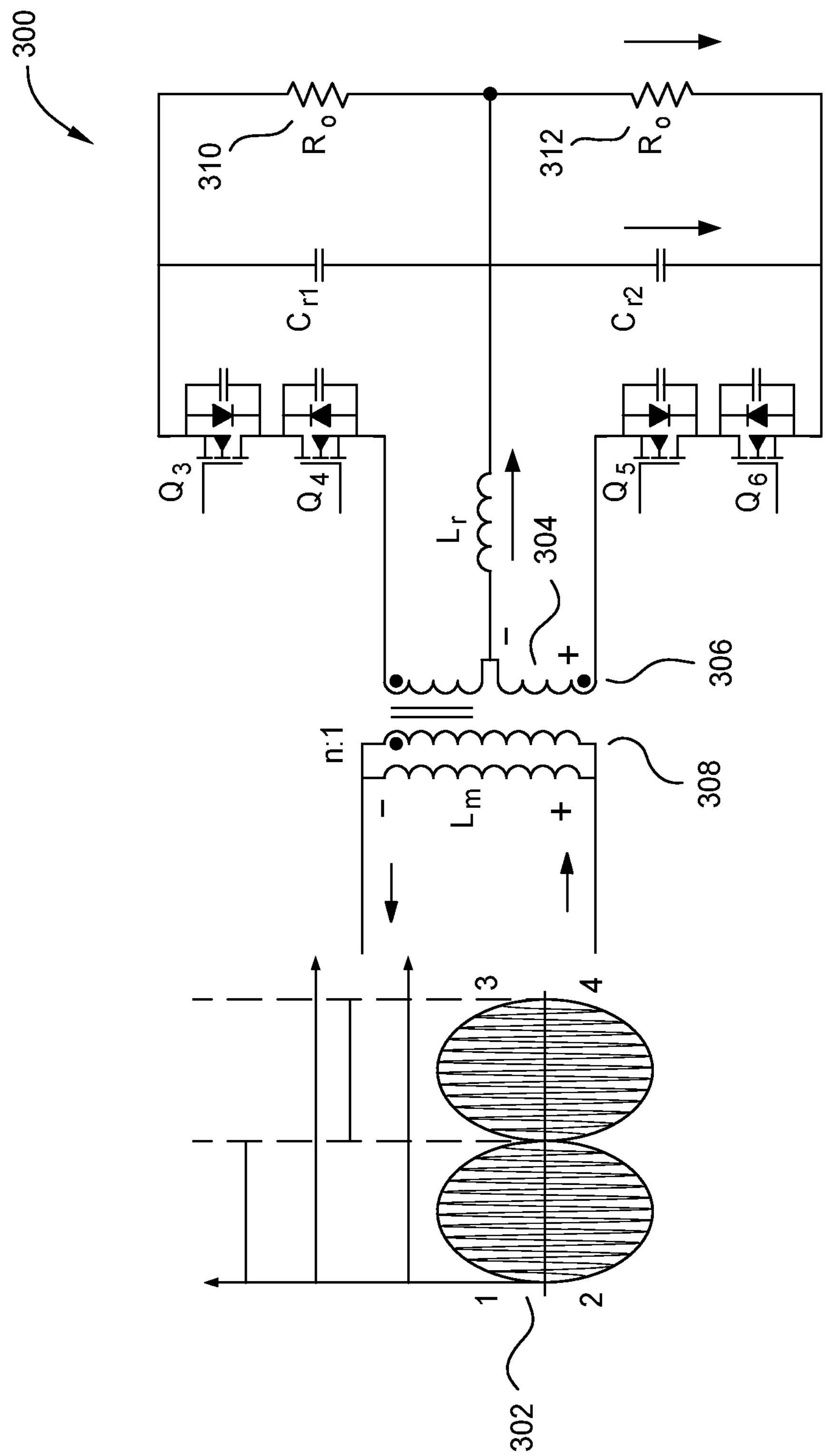
FIG. 3 is a circuit diagram of an embodiment of transformer system that includes a resonant converter, such as the resonant converter of FIG. 1, but with components selected that are responsible for converting a first negative half cycle of an AC waveform to the second output.

FIG. 3 is a circuit diagram of an embodiment of transformer system 300 that includes a resonant converter, such as the resonant converter of FIG. 1. The system 300 shows components 322 highlighted that are responsible for outputting a first negative half cycle 2 of an AC waveform 302. Generation of the first negative half cycle 2 of the AC waveform 302 may be generated in terms of the circuit diagram of FIG. 3 using the center tap inductor Lr, a first portion 304 of a secondary coil 306, a primary coil 308, a resistive output load 312, capacitance Cr2, and switches Q5 and Q6. Arrows show the flow of current through the circuit diagram of the transformer system. As with the resonant converter shown in FIG. 1, the embodiment of the converter in FIG. 3 may also include a magnetizing inductance Lm, a resistive output load 310, a capacitance Cr1, and switches Q3 and Q4.

Figure 4:
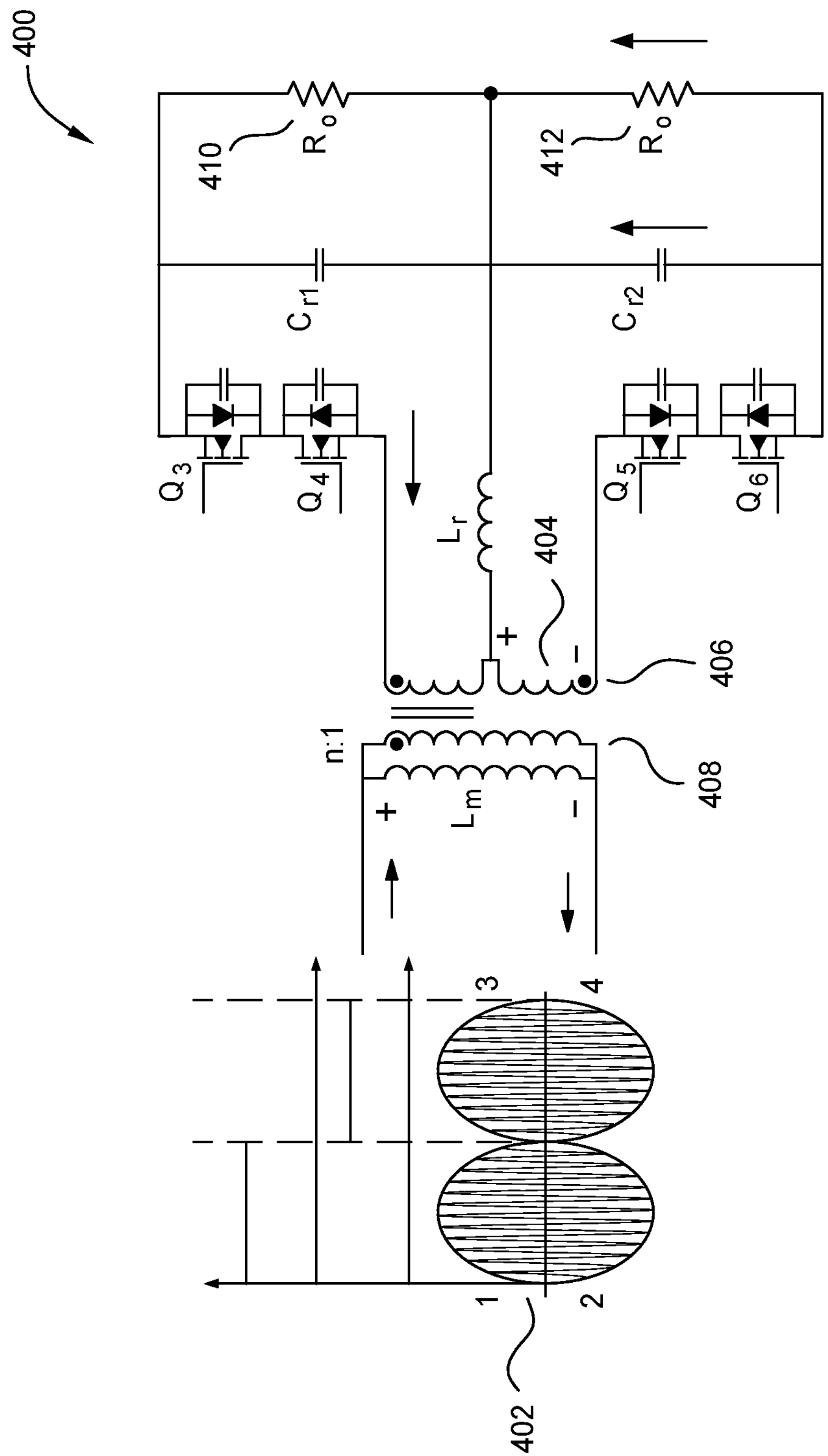
FIG. 4 is a circuit diagram of an embodiment of transformer system that includes a resonant converter, such as the resonant converter of FIG. 1, with components selected that are responsible for converting a second positive half cycle of an AC waveform to the second output.

FIG. 4 is a circuit diagram of an embodiment of transformer system 400 that includes resonant converter, such as the resonant converter of FIG. 1, with components selected that are responsible for outputting a second positive half cycle 3 of an AC waveform 402. Generation of the second positive half cycle 3 of the AC waveform 402 may be generated in terms of the circuit diagram of FIG. 4 using the center tap inductor Lr, a first portion 404 of a secondary coil 406, a primary coil 408, a resistive output load 412, capacitance Cr2, and switches Q5 and Q6. Arrows show the flow of current through the circuit diagram of the transformer system. As with the resonant converter shown in FIG. 1, the embodiment of the converter in FIG. 4 may also include a magnetizing inductance Lm, a resistive output load 410, a capacitance Cr1, and switches Q3 and Q4.

Figure 5:
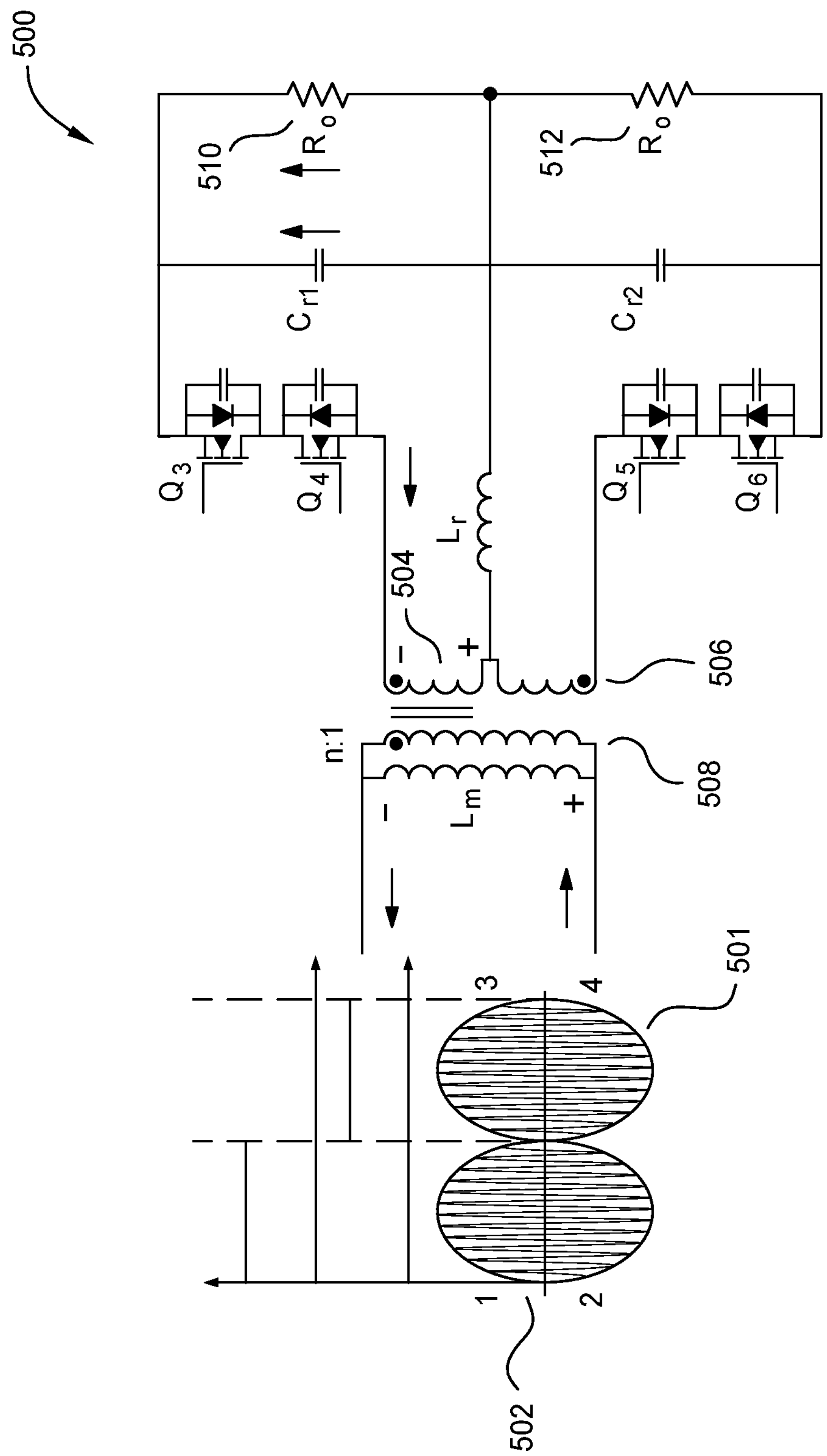
FIG. 5 is a circuit diagram of an embodiment of transformer system that includes a resonant converter, such as the resonant converter of FIG. 1, with components highlighted that are responsible for converting a second negative half cycle of an AC waveform to the first output.

FIG. 5 is a circuit diagram of an embodiment of transformer system 500 that includes resonant converter, such as the resonant converter of FIG. 1, with components highlighted that are responsible for outputting a second negative half cycle 501 of an AC waveform 502. Generation of the second negative half cycle 501 of the AC waveform 502 may be generated in terms of the circuit diagram of FIG. 5 using the center tap inductor Lr, a first portion 504 of a secondary coil 506, a primary coil 508, a resistive output load 510, capacitance Cr1, and switches Q3 and Q4. Arrows show the flow of current through the circuit diagram of the transformer system. As with the resonant converter shown in FIG. 1, the embodiment of the converter in FIG. 5 may also include a magnetizing inductance Lm, a resistive output load 510, a capacitance Cr2, and switches Q5 and Q6.

Figure 6:
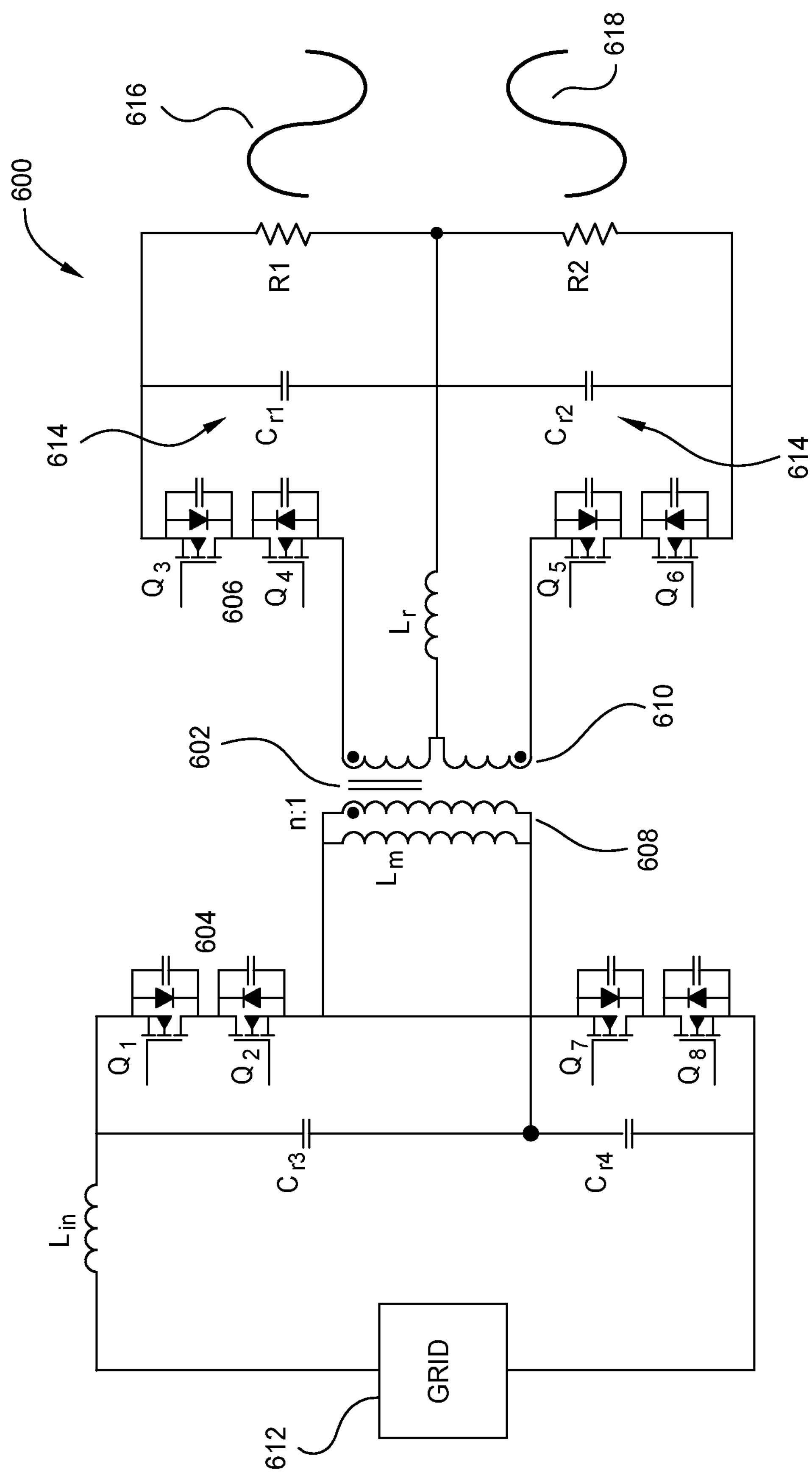
FIG. 6 is a circuit diagram of an embodiment of transformer system that includes a resonant converter similar to that shown in FIGS. 1-5 to perform AC to AC conversion, and also shows additional components on the primary side of the transformer circuit.

FIG. 6 is a circuit diagram of an embodiment of transformer system 600 that includes a resonant converter similar to that shown in FIGS. 1-5 to perform AC to AC conversion, and also shows additional components on the primary side of the transformer circuit. In FIG. 6, components to the left of the transformer core 602 includes a primary (e.g., input) side 604, while components to the right of the transformer core 602 include a secondary (e.g., output) side 606 of a transformer system 600.

As illustrated in FIG. 6, the primary side 604 of the transformer system 600 includes four switches Q1, Q2, Q7, and Q8. The switches Q1, Q2, Q7, and Q8 may be controlled to generate the high frequency pulses on primary side 604. Additional switches Q3, Q4, Q5, and Q6 of the secondary side 606 may be controlled to provide the two sine output waveforms 616, 618. A magnetization flux is created via a magnetizing inductor, Lm, which may be positioned in the primary coils 608 of the transformer. An inductor Lin may form a filter, along with capacitors Cr3 and Cr4.

The secondary side 606 includes a center tap inductor Lr that is coupled to or otherwise in electrical communication with the secondary transformer coil 610. The center tap inductor Lr of FIG. 1 may function as a resonant conductor. The frequency of the high frequency AC waveform may be set to match the resonant frequency of the center tap inductor Lr and the capacitator Cr1. This frequency can also be changed to modify the output voltage 616 and 618. The capacitors Cr1 and Cr2 may comprise two split phase outputs 614.

Figure 7:
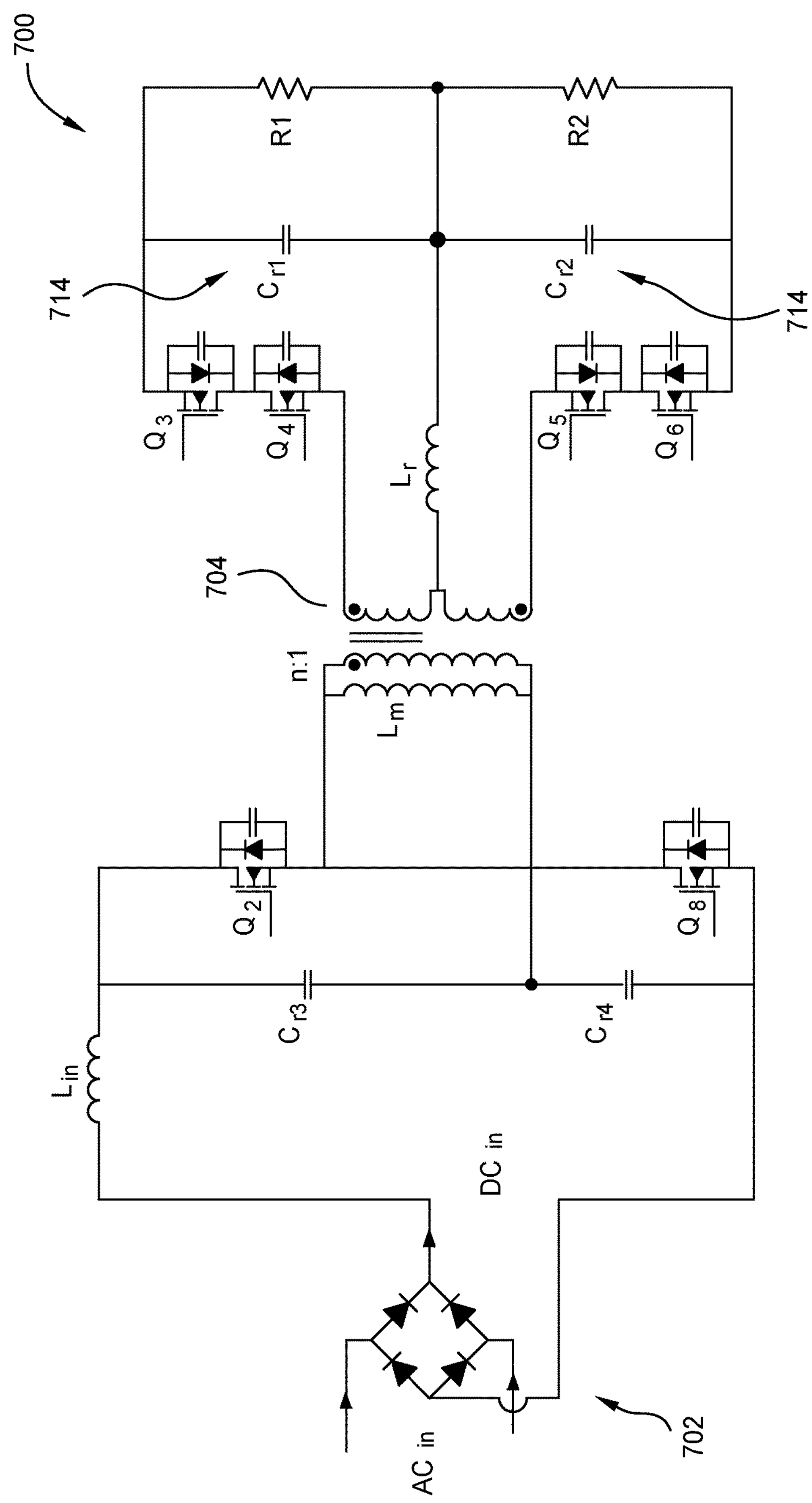
FIG. 7 is a circuit diagram of an embodiment of transformer system that includes a resonant converter to perform AC to AC conversion, and that includes a diode bridge on the primary side of the circuit.

FIG. 7 is a circuit diagram of an embodiment of transformer system 700 that includes a resonant converter to perform AC to AC conversion, and that includes a diode bridge 702 on the primary side of the circuit. The diode bridge 702 may include four diodes in a bridge circuit configuration that provides the same polarity of output for either polarity of input. Without the diode bridge 702, the converter could use four switches on the primary side to accommodate the positive and negative waveforms of the grid voltage. Because the diode bridge 702 rectifies the alternating current, only two switches Q2 and Q8 may be used on the primary side of the resonant converter. Put another way, the diode bridge 702 causes power to flow only from left to right, as shown in FIG. 7, rather than the power alternating back and forth. As a consequence, the inclusion of the bridge diode 702 in the embodiment of the resonant converter may reduce costs and space allocations by using fewer switches.

As in other embodiments described herein, capacitors Cr1 and Cr2 may comprise two split phase outputs. The transformer system 700 includes a center tap inductor Lr that is coupled to or otherwise in electrical communication with the secondary transformer coil 704. Switches Q3, Q4, Q5, and Q6 may be controlled to provide desired output waveforms. As in other embodiments, the switches Q3, Q4, Q5, and Q6 may be any unidirectional switch. Center tap inductor Lr and a capacitance Cr1 form one resonant loop, and center tap inductor Lr and a capacitance Cr2 form another resonant loop. In the circuit diagram, capacitances Cr1 and Cr2 comprise two split phase outputs 120 that power two resistive loads R1, R2.

Figure 8:
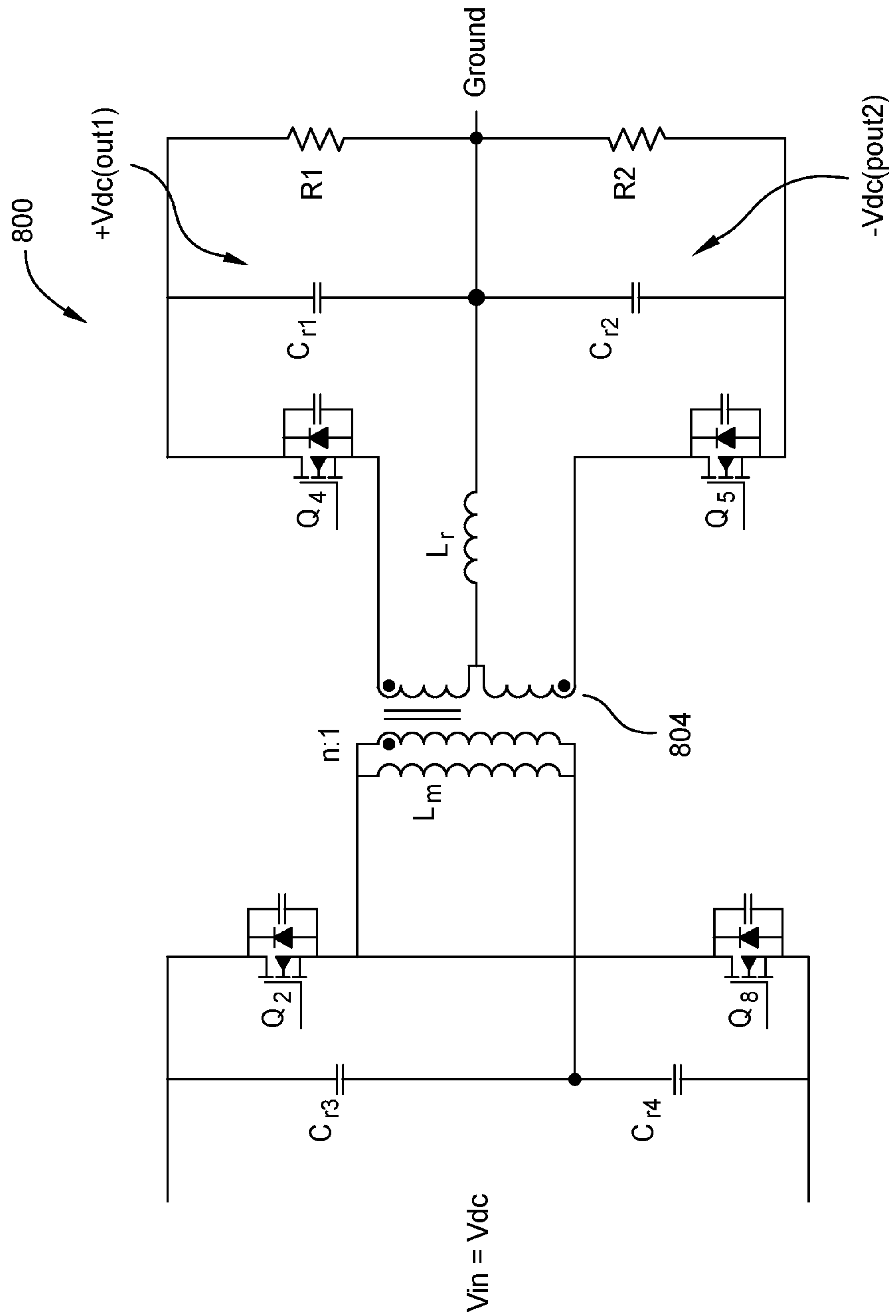
FIG. 8 is a circuit diagram of an embodiment of transformer system that includes a converter to perform a DC to DC conversion with two output voltages.

FIG. 8 is a circuit diagram of an embodiment of system 800 that includes a converter to perform a DC to DC conversion. With a center tap inductor Lr, the circuit diagram is analogous to a DC version of one or more of the AC to AC embodiments described herein. In the embodiment of the FIG. 8, the converter may output positive and negative DC voltages with one positive DC input voltage. Thus, the circuit diagram comprises a DC slit phase configuration where positive and negative voltages are desired at the output. For instance, the embodiment of the converter may output half of the input voltage Vin at each of R1 and R2. More particularly, Cr1 may have a positive voltage that is half of the magnitude of the input voltage Vin, and Cr2 may have a negative voltage that is half of the magnitude of the input voltage Vin. Due to the DC nature of the circuit, only two switches (e.g., rather than four) are used on each of the primary and secondary sides of the transformer system 800.

The transformer system 800 includes a center tap inductor Lr that is coupled to or otherwise in electrical communication with the secondary transformer coil 804. Switches Q4, Q5 may be controlled to provide desired outputs on the secondary side, and switches Q2, Q8 may be used on the primary side. As in other embodiments, the switches may be any unidirectional switch. Center tap inductor Lr and a capacitance Cr1 form one resonant loop, and center tap inductor Lr and a capacitance Cr2 form another resonant loop. As with the other embodiments described herein, the converter may operate in either resonant or non-resonant modes.

Figure 9:
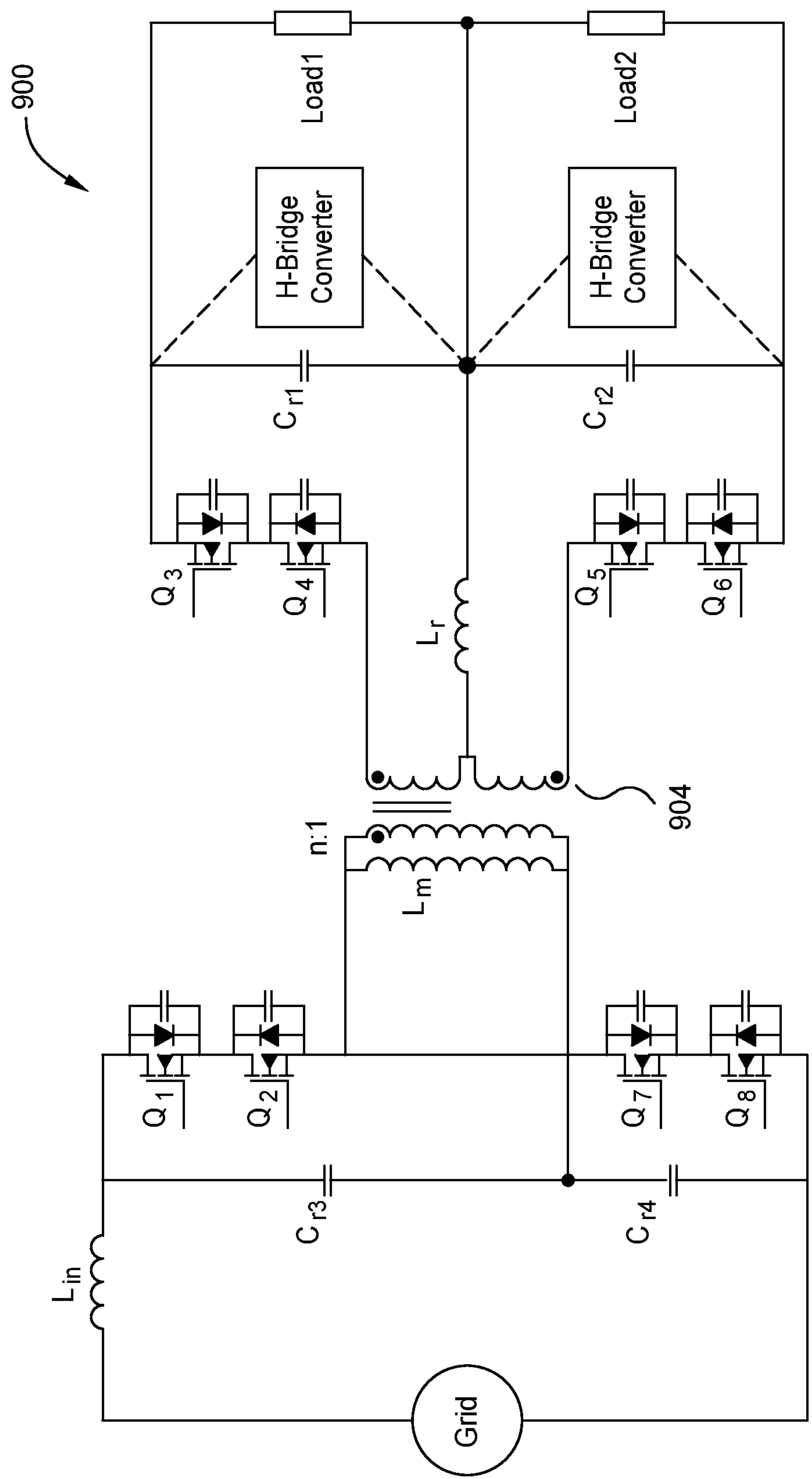
FIG. 9 is a circuit diagram of an embodiment of transformer system that includes a converter to perform AC to AC conversion, and that includes two H bridge converters on the secondary side of the circuit diagram.

FIG. 9 is a circuit diagram of an embodiment of transformer system 900 that includes a converter to perform AC to AC conversion, and that includes H-bridge converters on the secondary side of the circuit diagram. The H-bridge converters may provide reactive power and an active filter function.

In the circuit diagram, the loads (e.g., loads 1 and 2) are not resistive. This state results in an inductive, reactive load and reactive current. A reactive load may not absorb power and may convert current into a magnetic field load. The magnetic field load and associated reactive power may interfere with operation of the grid transformer. The H-bridge converters may function as a reactive power compensator to offset the reactive loads. The H-bridge converters may be connected such that the reactive current is absorbed by the H-bridge converters instead of traveling back to the grid or otherwise making the system vulnerable to short circuit. For instance, the H-bridge converters may provide current to compensate current higher than 60 Hz (e.g., higher harmonics).

The input, or primary side of the transformer circuit may be controlled using switches Q1, Q2, Q7, and Q8. The secondary side of the transformer circuit includes a center tap inductor Lr that is coupled to or otherwise in electrical communication with the secondary transformer coil 904. Switches Q3, Q4, Q5, and Q6 may be controlled to provide desired output waveforms. As in other embodiments, the switches Q3, Q4, Q5, and Q6 may be any unidirectional switch. The center tap inductor Lr and a capacitance Cr1 form one resonant loop, while the center tap inductor Lr and a capacitance Cr2 form another resonant loop. In another embodiment, the output may not be a resistive load, and may be any other power factor load.

Figure 10:
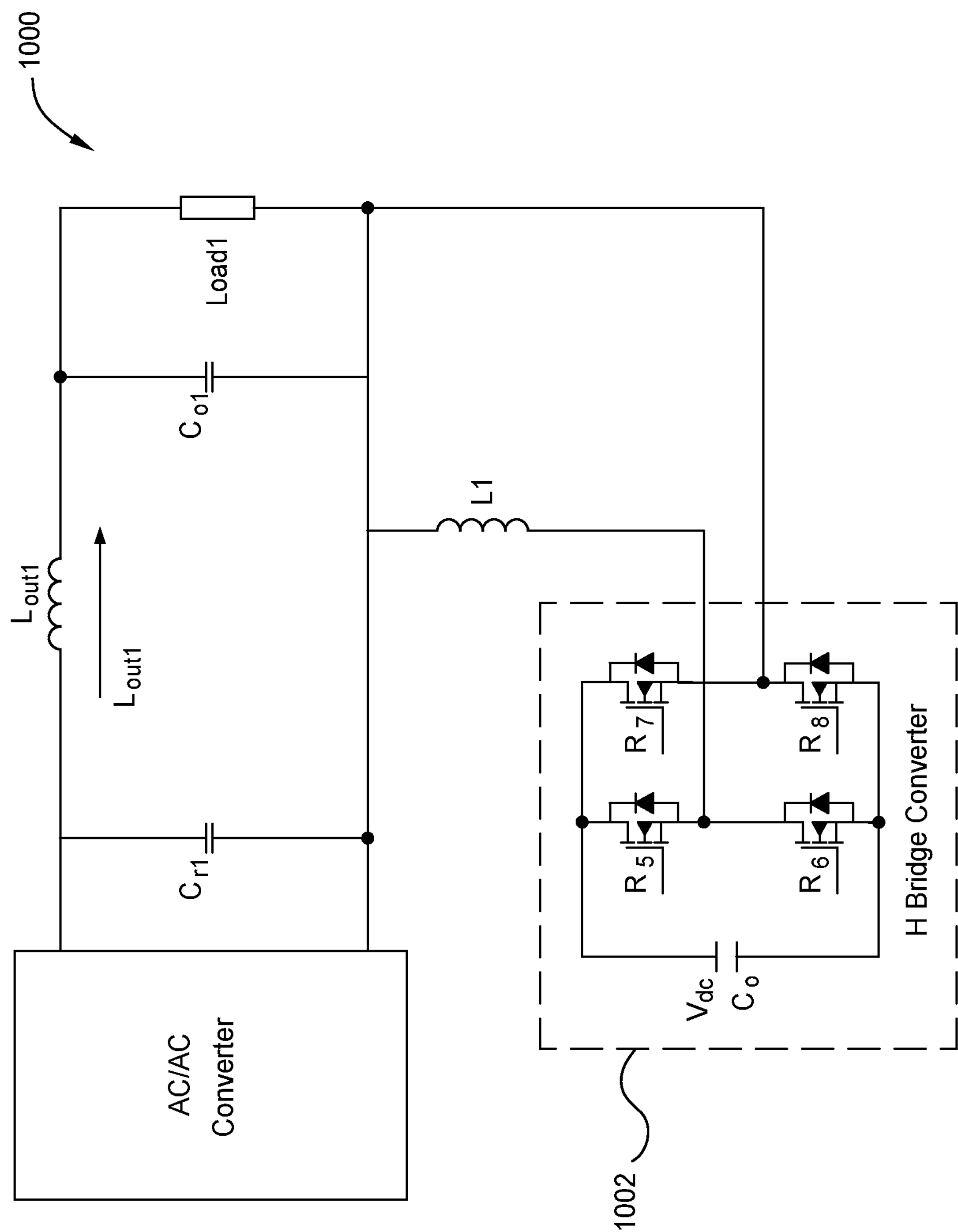
FIG. 10 is an embodiment of a circuit diagram of a transformer system to perform AC to AC conversion using a specific implementation of an H bridge converter.

FIG. 10 is an embodiment of a circuit diagram of a transformer system 1000 to perform AC to AC conversion using a bridge converter 1002. FIG. 10 more specifically shows an illustrative H-bridge converter configuration attached to an AC to AC converter. Similar to the converter shown in FIG. 9, the H bridge converter 1002 is positioned on the secondary side of the circuit diagram.

Four switches R5, R6, R7, and R8 may be used to provide reactive power and an active filter function. L1 may form a filter between the H-bridge, and Load 1 and Lout may form an additional filter for AC/AC conversion. As with other embodiments described herein, the switches may comprise MOSFETs or insulated-gate bipolar transistors (IGBTs). The switches R5, R6, R7, and R8 may be controlled to make the current Iout1 be in phase with the voltage Vout1. The switches R5, R6, R7, and R8 may be controlled to make Iout1 leading or lagging Vout1, hence providing reactive power to compensate the reactive power needed by Loath. The switches R5, R6, R7, and R8 may be controlled to make the current Iout1 be in phase with the voltage Vout1, if a DC energy source is connected to the DC capacitor Co, such as a PV or a battery. A DC load may also be connected to the DC capacitor Co, and the switches R5, R6, R7, and R8 may be controlled to make the current Iout1 out of phase with the voltage Vout1. The AC/AC converter may include a center tap inductor and other hardware, as shown in FIG. 9. The center tap inductor Lr and a capacitance may Cr1 form one resonant loop, and the center tap inductor Lr and a capacitance C01 may form another resonant loop.

Figure 11:
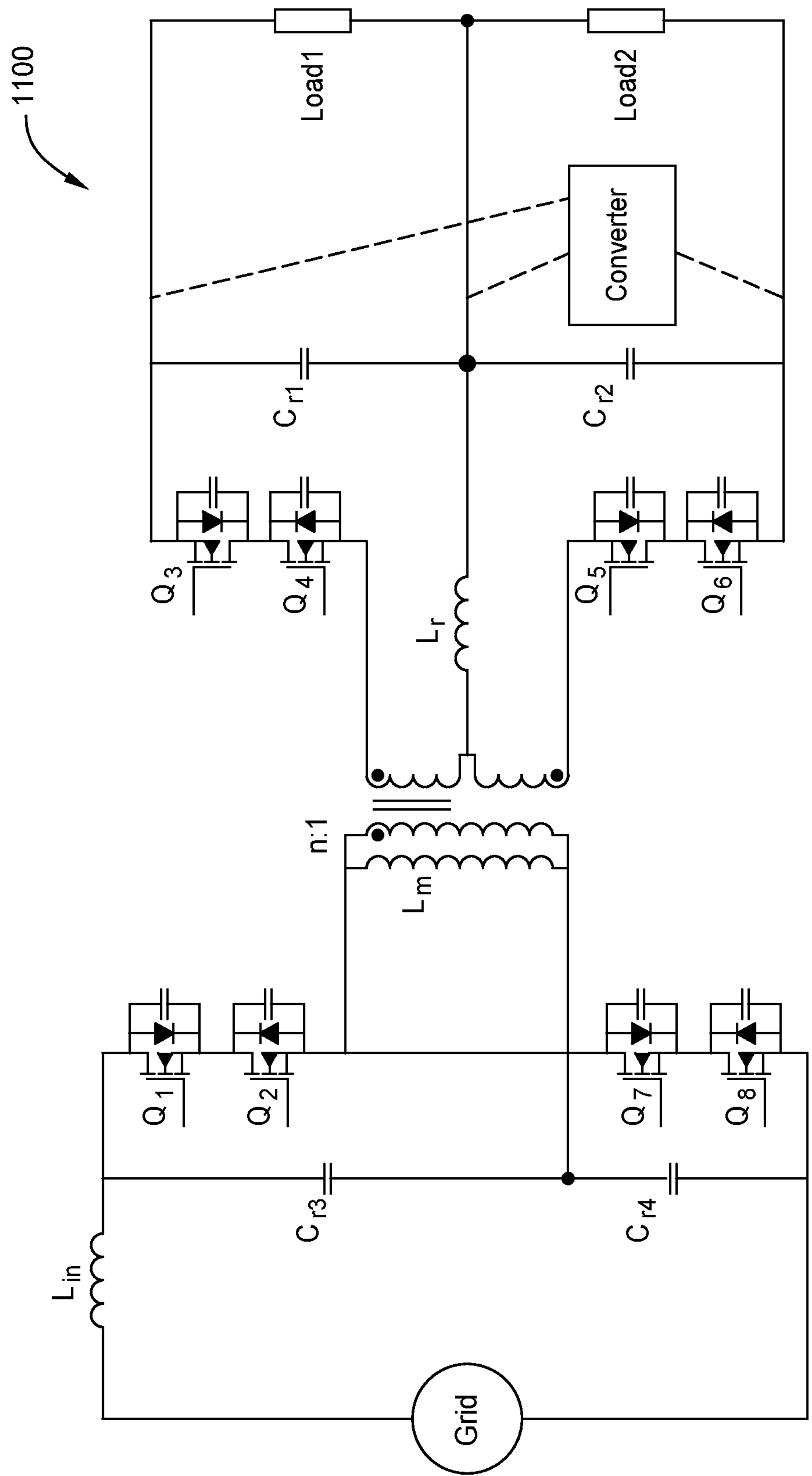
FIG. 11 is a circuit diagram of an embodiment of transformer system that includes a converter to perform AC to AC conversion, as well as a single three phase converter on the secondary side.

FIG. 11 is a circuit diagram of an embodiment of transformer system 1100 that includes a converter to perform AC to AC conversion, as well as a single three phase converter on the secondary side. As with the multiple H bridge converters of FIG. 9, the converter may provide reactive power and an active filter function.

Figure 12:
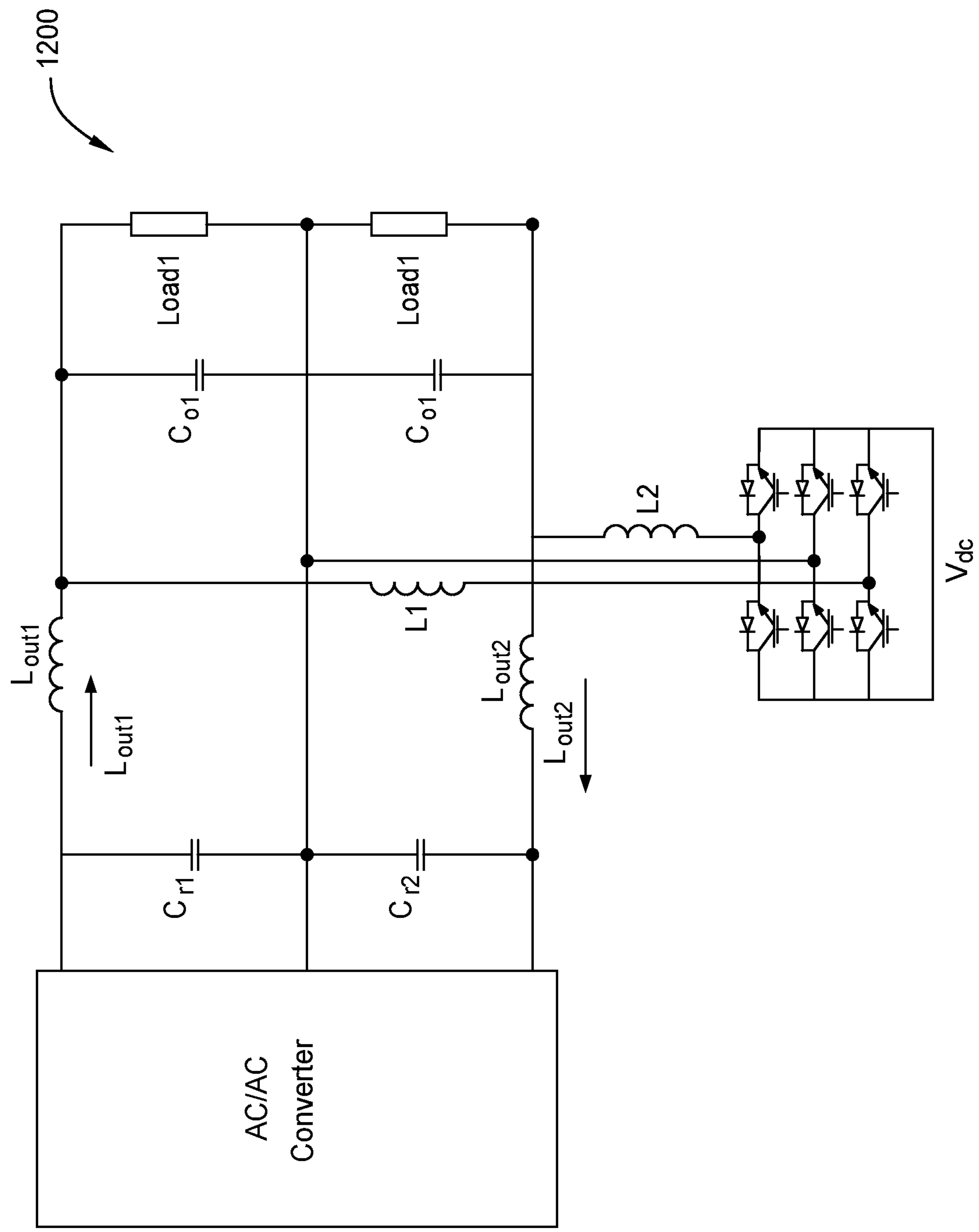
FIG. 12 is an embodiment of a circuit diagram of a system to perform AC to AC conversion using a particular configuration of a three phase converter on the secondary side.

FIG. 12 is an embodiment of a circuit diagram of a system 1200 to perform AC to AC conversion. Similar to the system 1100 shown in FIG. 11, the system 1200 includes a three phase converter on the secondary side of the circuit diagram. FIG. 12 more specifically shows a particular H-bridge converter configuration 1202 attached to an AC to AC converter.

Six switches R5, R6, R7, R8, R9, and R10 may be used to provide reactive power and an active filter function. As with other embodiments described herein, the switches may comprise MOSFETs or an insulated-gate bipolar transistors (IGBTs). Lout1, Lout2, L1, and L2 may comprise inductor filters. The converter may be configured to make the current Iout1 leading or lagging the voltage Vout1, as well as the current Iout2 lagging or leading with the voltage Vout2. The switches R5, R6, R7, R8, R9, and R10 may additionally be controlled to make Iout1 in phase with the voltage Vout1 if an energy source is connected on the DC side of the three phase converter. The switches R5, R6, R7, R8, R9, and R10 may additionally be controlled to make IoutIout of phase with Vout1 (e.g., when a DC load is connected on the DC side of the three phase converter). In the system 1200, Iout2 may lead or lag Vout2 (e.g., in phase with the Vout2, or out of phase with Vout2). The AC/AC converter may include a center tap inductor and other hardware, as shown in FIG. 11.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described above are merely illustrative and are not considered elements or limitations of the appended claims except where explicitly recited in a claim(s). Likewise, reference to “the invention” shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.”

While the foregoing is directed to embodiments of the present invention, other and further embodiments of the invention may be devised without departing from the basic scope thereof, and the scope thereof is determined by the claims that follow.

What is claimed is:

1. An apparatus comprising:

a primary transformer coil;

a center tapped secondary transformer coil;

an inductor with a first end that is directly coupled to a center tap of the secondary transformer coil;

a first switch in electrical communication with the inductor, the secondary transformer coil being configured to affect a first output voltage; and a second switch in electrical communication with the inductor, the secondary transformer coil and the second switch being configured to affect a second output voltage.

2. The apparatus of claim 1, further comprising:
a first capacitor coupled to the inductor and to the first switch;
a second capacitor coupled to the inductor and to the second switch;
a first output connected to the first capacitor; and
a second output connected to the second capacitor.

3. The apparatus of claim 2, wherein the apparatus comprises a resonant converter.

4. The apparatus of claim 2, further comprising:
an output filter inductor positioned between the first capacitor and the first output, and
a second filter inductor positioned between the second capacitor and the second output.

5. The apparatus of claim 1, wherein the apparatus comprises a non- resonant converter.

6. The apparatus of claim 1, further comprising an H-bridge converter to provide reactive power support, wherein the H-bridge converter is connected to at least one secondary side output.

7. The apparatus of claim 1, further comprising:
a third switch;
a fourth switch; and
an input filter comprising a first inductor and a first capacitor in electrical communication with the primary transformer coil.

8. The apparatus of claim 1, further comprising a diode bridge in electrical communication with the primary transformer coil.

9. The apparatus of claim 1, wherein the first switch is operated to control a positive half cycle of the first output voltage, and wherein the second switch is operated to control a negative half cycle of the second output voltage.

10. The apparatus of claim 1, wherein the first switch is operated to control a negative half cycle of the first output voltage, and wherein the second switch is operated to control a positive half cycle of the second output voltage.

11. The apparatus of claim 1, wherein the first switch is operated to control a positive direct current output, and wherein the second switch is operated to control a negative direct current output.

12. A method of manufacturing a circuit, the method comprising:
providing a primary transformer coil;
providing a secondary transformer coil;
coupling an inductor directly to a center tap of the secondary transformer coil;
providing a first switch in electrical communication with the inductor, wherein the first switch is configured to affect a first output voltage; and
providing a second switch in electrical communication with the inductor, wherein the second switch is configured to affect a second output voltage.

13. The method of claim 12, further comprising providing a diode bridge in electrical communication with the primary transformer coil.

14. The method of claim 12, further comprising:
providing a first capacitor coupled to the inductor and to the first switch;
providing a second capacitor coupled to the inductor and to the second switch;
providing a first output connected to the first capacitor; and
providing a second output connected to the second capacitor.

15. The method of claim 14, further comprising providing an output inductor filter in electrical communication with the first capacitor and the second output.

16. The method of claim 12, further comprising providing an H-bridge to provide reactive power support.

17. The method of claim 12, further comprising wiring the second switch to control a positive half cycle of a final output voltage comprising the first and second output voltages.

18. The method of claim 12, further comprising wiring the second switch to control a negative half cycle of a final output voltage comprising the first and second output voltages.

19. The method of claim 12, further comprising wiring the first switch to control a direct current output.

20. An apparatus comprising:
a primary transformer coil;
a secondary transformer coil;
an inductor coupled at a first end to a center tap of the secondary transformer coil;
a first pair of switches coupled in series, wherein a first end of the first pair of switches is coupled with a second end of the inductor and a second end of the first pair of switches is coupled with a first end of the secondary transformer coil, wherein the first pair of switches is configured to affect a first output voltage; and
a second pair of switches coupled in series, wherein a first end of the second pair of switches is coupled with the second end of the inductor and a second end of the second pair of switches is coupled with a second end of the secondary transformer coil, wherein the second pair of switches is configured to affect a second output voltage.

* * * * *